United States Patent
Thomas, Jr.

(10) Patent No.: US 7,430,258 B2
(45) Date of Patent: Sep. 30, 2008

(54) ARCHITECTURE FOR MULTI-CHANNEL DIGITAL SIGNAL PROCESSING

(75) Inventor: Daniel D. Thomas, Jr., Baldwinsville, NY (US)

(73) Assignee: Syracuse Research Corporation, North Syracuse, NY (US)

( * ) Notice: Subject to any disclaimer, the term of this patent is extended or adjusted under 35 U.S.C. 154(b) by 822 days.

(21) Appl. No.: 11/025,195

(22) Filed: Dec. 29, 2004

(65) Prior Publication Data

US 2006/0140291 A1    Jun. 29, 2006

(51) Int. Cl.
H04B 7/10 (2006.01)
(52) U.S. Cl. ..................................... 375/347
(58) Field of Classification Search ................. 375/347, 375/267
See application file for complete search history.

(56) References Cited

U.S. PATENT DOCUMENTS 6,128,334 A * 10/2000 Dapper et al. ............... 375/216

2006/0165199 A1 * 7/2006 Takemoto et al. ........... 375/347

* cited by examiner

*Primary Examiner*—Kevin Y Kim
(74) *Attorney, Agent, or Firm*—Daniel P. Malley; Bond, Schoeneck & King, PLLC

(57) ABSTRACT

The present invention is directed to a multi-channel signal processing system that includes a fast Fourier transform (FFT) module configured to perform an FFT using a first channel time domain sample as the in-phase component of a complex signal input, and by using the second channel time domain sample as a quadrature component of the complex signal input. The FFT module provides a complex signal spectrum. A channel processing module is coupled to the FFT module. The channel processing module is configured to extract a channel sample spectrum as a function of the complex signal spectrum. A channel equalization module is coupled to the channel processing module. The channel equalization module is configured to multiply the channel sample spectrum by a channel reference spectrum to obtain a correlated and equalized channel sample spectrum.

57 Claims, 6 Drawing Sheets

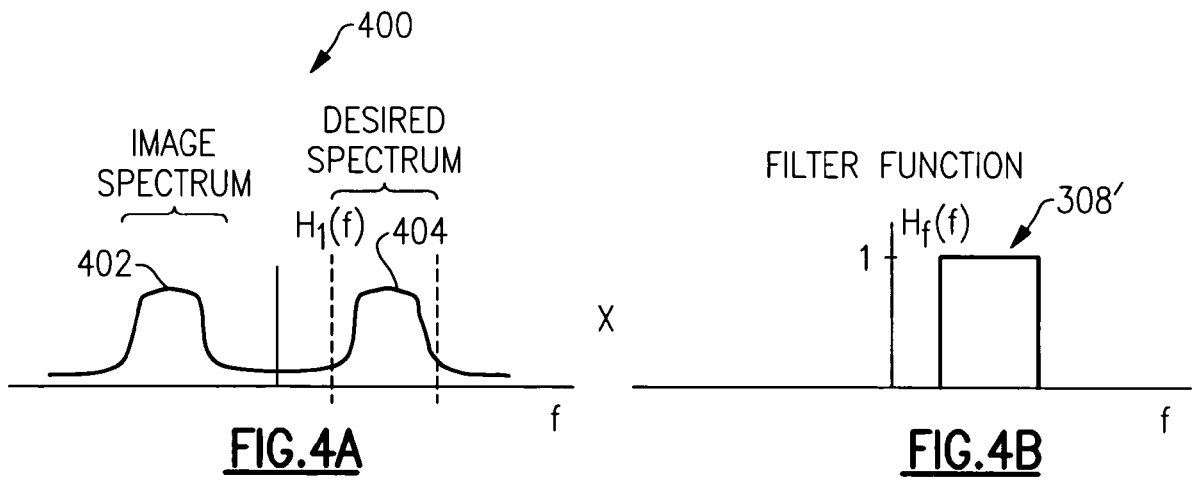
FIG.4A
FIG.4B
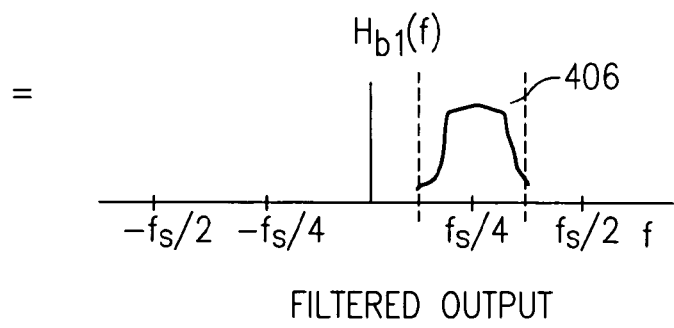
FILTERED OUTPUT
FIG.4C
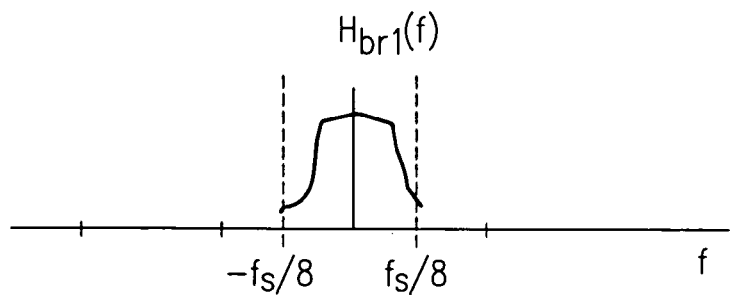
FIG.5 ns to capture electromagnetic signals having predetermined
ARCHITECTURE FOR MULTI-CHANNEL DIGITAL SIGNAL PROCESSING

BACKGROUND OF THE INVENTION

1. Field of the Invention

The present invention relates generally to signal processing, and particularly to multi-channel digital signal processing.

2. Technical Background

Radar, sonar, and other communication systems, such as spread spectrum communication systems, are sophisticated systems configured to detect and interpret transmitted and/or reflected signals propagating in a communication channel. Radar and other radio frequency (RF) systems employ antentransmission characteristics. Sonar systems include hydrophonic sensors for sensing acoustic signals propagating in a marine environment. Signals propagating in such communication channels may be reflected, attenuated, and affected by other transmission path characteristics. As such, a narrow, rectangular pulse transmitted by a signal source typically arrives at the receiver as a relatively wide, attenuated, and rounded signal, corrupted by noise. Furthermore, a single transmitted pulse may arrive at the receiver as two or more multi-path signals displaced in time from each other. The front-end receiver, therefore, must be able to recover a clean version of the transmitted signal from a received signal which has been distorted and corrupted by noise and from multipath signals. In doing so, the front-end receiver provides a signal at some intermediate frequency (IF). The IF signal typically includes many of the channel-induced distortions, including the multipath signals described above. Subsequently, the effects of the channel-induced distortions are mitigated using a process generally referred to as adaptive equalization.

In one approach that has been considered, a receiver is implemented using a multipath time delay and correlation bandwidth analyzer. A signal received by the receiver is correlated with a selected reference signal generated at the receiver. The correlator will generate two or more correlation pulses or maxima, also displaced in time, if the received signal contains strong multi-path contributions. The reference signal may be a time-delayed replica of the received signal.

In another approach that has been considered, an adaptive array of spaced-apart antennas is provided. Each antenna signal is processed identically. Each processing element includes a band pass filter, a local oscillator, a signal mixer and a tapped time delay line. The processed signals are adaptively weighted by a feedback loop and added together to provide a signal with reduced multipath contributions. In yet another approach that has been considered, a multipath receiver apparatus is configured to compare a time-delayed replica of a transmitted signal with the received signal. A signal propagation time delay is selected to maximize the correlation signal.

While the approaches discussed above have their advantages and drawbacks, modem adaptive equalization schemes are typically implemented in software and executed by a digital signal processor (DSP). At the heart of any equalizer is one or more adaptive filters, which are easily implemented in software. Adaptive filters may be used for noise cancellation, echo cancellation, beam forming, in addition to equalization.

Referring to FIG. 1, a conventional DSP-based multi-channel radar receiver 1 is shown. In particular, receiver 1 is shown as a two-channel system. Antenna 2 and front end receiver 3 sense and detect RF signals propagating in the environment. Receiver 3 directs analog signal $h_1(t)$ into analog-to-digital (A/D) converter 4. The A/D converter 4 samples the amplitude of the analog signal at discrete time intervals and the resultant digital values are stored in a memory buffer for subsequent processing. In one embodiment, receiver 3 provides an IF signal, the frequency of which, is one-fourth that of the sampling frequency of A/D converter 4. Subsequently, the digital data $h_1[n]$ representing signal $h_1(t)$ is directed into Discrete Hilbert Transform (DHT) filter 5. The output of DHT filter 5 is a stream of complex signal samples, i.e., the in-phase (I) and quadrature (Q) components of $h_1[n]$ shifted in frequency to baseband. Those skilled in the art will recognize that the I-component and the Q-component have the same frequency but differ in phase by 90°. Essentially, DHT 5 is implemented in a DSP by a pair of tapped-delay line or finite impulse response (FIR) bandpass filters. The output of the DHT is decimated, i.e. only every $n^{th}$ sample of the output is used, effectively shifting the frequency to baseband by means of aliasing.

Next, the quadrature components are directed into adaptive equalizer (AE) filter 6 to facilitate later clutter and/or interference cancellation. If the radar employs a phased array antenna, time delay filter 7 may be used to implement time-delay steering. Finally, the filtered I, Q signals are directed into pulse compressor 8. In this block, the signals are correlated with a signal reference to obtain pulse compression. A more detailed diagram of pulse compression filter 8 is shown in FIG. 2.

Referring to FIG. 2, pulse compressor 8 is implemented in the frequency domain. A correlation is performed in the time-domain by a convolution operation. However, those of ordinary skill in the art understand that a convolution in the time domain corresponds to a multiplication in the frequency domain. Accordingly, a correlation function is easily implemented in the frequency domain for the above stated reasons and the I, Q components are directed into a fast Fourier transform module 800 to obtain the spectral representation of the filtered I, Q components. The correlation is then calculated by multiplying $I(f)+jQ(f)$ by the reference signal. Finally, the time domain representation of the pulse compression output is obtained by performing an inverse fast Fourier Transform (IFFT) 804. Note that in the above discussion, only channel (1) one has been discussed. However, channel (2) two operations are identical.

One drawback to the approach described above and illustrated in FIG. 1 and FIG. 2 relates to the relative inefficiency of the design. For example, an FFT (see FIG. 2) must be implemented for each channel, as well as multiple filters. What is needed is a system and method for making multi-channel signal processing more efficient.

SUMMARY OF THE INVENTION

The present invention addresses many of the needs described above. In particular, the present invention is directed to an efficient multi-channel processing system that may be employed in radar, sonar, multi-channel RF communication systems, and in other multi-channel communication systems such as those employed in telecommunications.

One aspect of the present invention is directed to a multi-channel signal processing system that includes a fast Fourier transform (FFT) module. The FFT module is configured to perform an FFT using a first-channel time-domain sample as an in-phase component of a complex signal input and using the second-channel time-domain sample as a quadrature component of the complex signal input. The FFT module provides a complex signal spectrum as an output. At least one intermediate frequency (IF) channel processing module is coupled to the FFT module. The at least one IF channel processing module is configured to extract at least one channel sample spectrum as a function of the complex signal spectrum. At least one baseband channel processing module is coupled to the at least one IF channel processing module. The at least one baseband channel processing module is configured to multiply the at least one channel sample spectrum by a channel reference spectrum to obtain a correlated and equalized at least one channel sample spectrum.

In another aspect, the present invention is directed to a method for processing multiple channels in a signal processing system. The method includes the step of providing a first channel time domain sample and a second channel time domain sample. An FFT of a complex signal is performed using the first channel time domain sample as an in-phase component of the complex signal and using the second channel time domain sample as a quadrature component of the complex signal. The FFT yields a complex signal spectrum. At least one channel sample spectrum is derived as a function of the complex signal spectrum. At least one baseband channel sample spectrum is extracted from the at least one channel sample spectrum. The at least one baseband channel sample spectrum is multiplied by a channel reference spectrum to obtain a correlated and equalized at least one channel sample spectrum.

In yet another aspect, the present invention is directed to a system that includes a first receiver system configured to provide a first channel time domain sample. The first channel time domain sample corresponds to a first signal propagating in an environment. A second receiver system is configured to provide a second channel time domain sample. The second channel time domain sample corresponds to a second signal propagating in the environment. A digital signal processor (DSP) is coupled to the first receiver system and the second receiver system. The DSP is programmed to: perform an FFT of a complex signal using the first channel time domain sample as an in-phase component of the complex signal and using the second channel time domain sample as a quadrature component of the complex signal, the FFT yielding a complex signal spectrum; derive a first channel sample spectrum and a second channel sample spectrum as a function of the complex signal spectrum; extract a first baseband channel sample spectrum from the first channel sample spectrum and a second baseband channel sample spectrum from the second channel sample spectrum; multiply the first baseband channel sample spectrum by a first channel reference spectrum to obtain a correlated and equalized first channel sample spectrum, and multiply the second baseband channel sample spectrum by a second channel reference spectrum to obtain a correlated and equalized second channel sample spectrum; and perform an IFFT on the correlated and equalized first channel sample spectrum and the correlated and equalized second channel sample spectrum to obtain first channel time domain output sample and a second channel time domain output sample.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIGS. 4A-4C are diagrams illustrating the functionality of the spectrum extraction filter depicted in FIG. 3;

FIG. 5 is diagram illustrating the frequency translation properties of the spectrum extraction filter depicted in FIG. 3;

DETAILED DESCRIPTION

Figure 1:
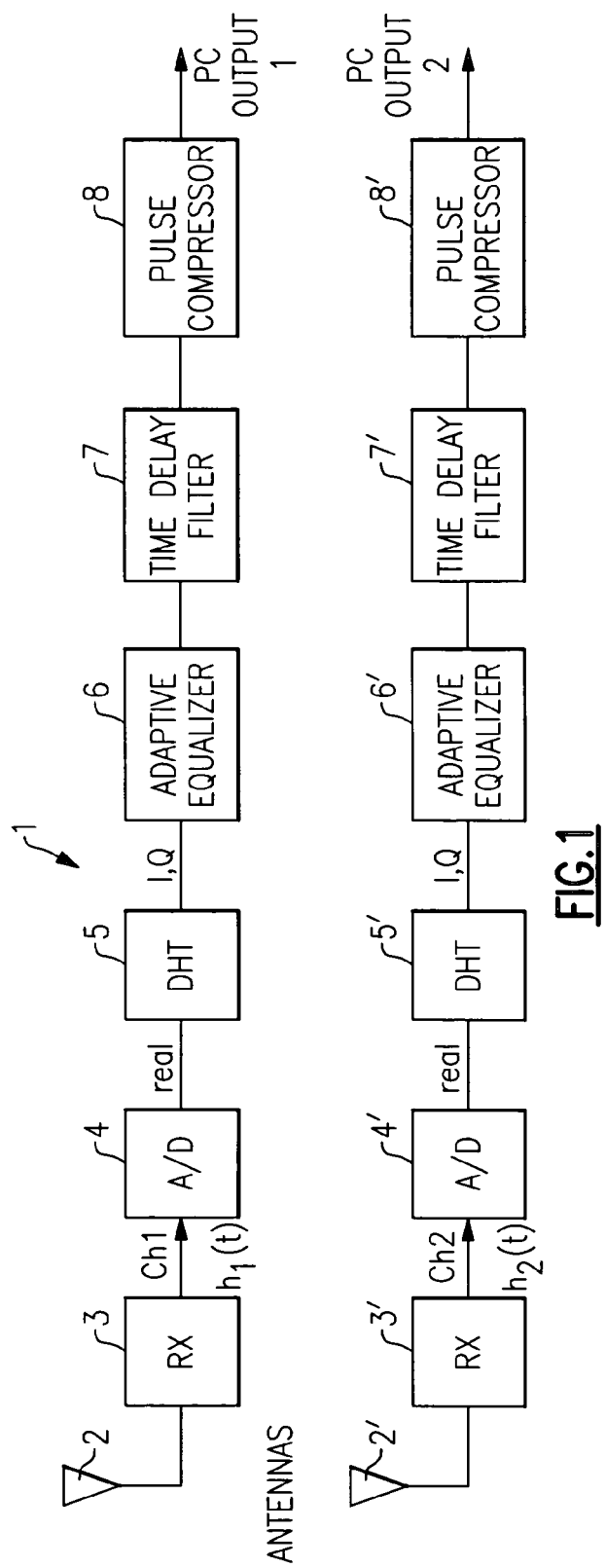
FIG. 1 is a block diagram of a conventional DSP based multi-channel radar receiver.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the multi-channel signal processing system of the present invention is shown in FIG. 3, and is designated generally throughout by reference numeral 10.

In accordance with the invention, the present invention is directed to a multi-channel signal processing system that includes a fast Fourier transform (FFT) module configured to perform an FFT of a complex signal input. A first channel time domain sample is used as the in-phase component of the complex signal input. A second channel time domain sample is used as the as the quadrature component of the complex signal input. The FFT module provides a complex signal spectrum as an output. At least one first channel processing module and at least one second channel processing module are coupled to the FFT module. The at least one first channel processing module and the at least one second channel processing module are configured to extract a first channel sample spectrum and a second channel sample spectrum, respectively, as a function of the complex signal spectrum. A first channel equalization module and a second channel equalization module are coupled to the at least one first channel processing module and the at least one second channel processing module, respectively. The channel equalization modules are configured to multiply the channel sample spectrums by a channel reference spectrum to obtain a correlated and equalized channel sample spectrum for each respective channel. Each correlated and equalized channel sample spectrum is correlated and equalized by the step of multiplying.

Figure 3:
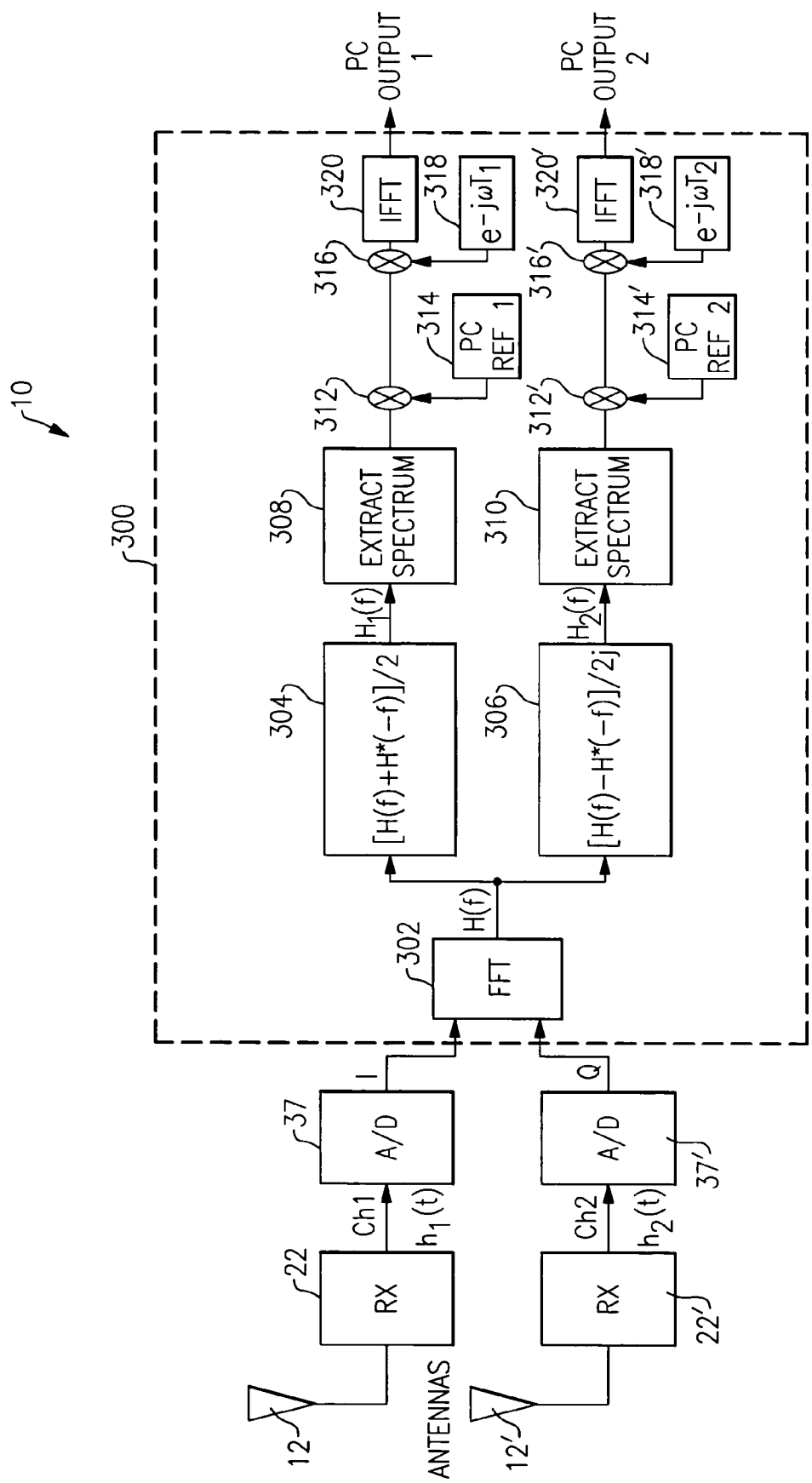
FIG. 3 is a diagrammatic depiction of a multi-channel processing architecture in accordance with one embodiment of the present invention.

As embodied herein and depicted in FIG. 3, a diagrammatic depiction of the multi-channel signal processing system in accordance with one embodiment of the present invention is disclosed. The subject matter of FIG. 3 is discussed in terms of a multi-channel radar digital radar processing system but those of ordinary skill in the art will recognize that the present invention should not be construed as being limited thereto. As will be shown in the examples provided below, it will be apparent to those of ordinary skill in the pertinent art that modifications and variations can be made to system 10 of the present invention. For example, system 10 may be employed in a radar system, in a communication system, in a sonar system, or in any type of system that employs multi-channel processing. Indeed, alternative examples are provided below in the text corresponding to FIGS. 6-8.

Referring to FIG. 3, system 10 includes first channel antenna 12 coupled to front end receiver 22. Antenna 12 provides receiver 22 with a radio frequency (RF) signal. As noted above in the Background Section, front end receiver 22 recovers a distorted and corrupted version of the radar pulse and provides A/D converter 37 with an intermediate frequency (IF) signal $h_1(t)$. A/D converter 37 samples the time domain signal at an appropriate sampling rate to obtain digital samples. In one embodiment, the frequency of the IF signal is four times the sampling frequency of A/D converters 37, 37'. The digital samples are stored in a first-in-first-out (FIFO) buffer (not shown for simplicity of illustration). The first channel digital samples are directed into digital signal processor 300 one at a time in the order they are received by the FIFO buffer. In particular, the first channel digital samples are directed into the in-phase input "I" of fast Fourier Transform (FFT) module 302.

The second channel apparatus is identical to the first channel apparatus. Front end receiver 22' also provides A/D converter 37' with a second channel intermediate frequency (IF) signal $h_2(t)$. A/D converter 37' samples the time domain signal at an appropriate sampling rate, identical to A/D converter 37, to obtain second channel digital samples. The digital samples are stored in a first-in-first-out (FIFO) buffer (not shown). The second channel digital samples are also directed into digital signal processor 300. However, the second channel digital samples are directed into the quadrature input "Q" of fast Fourier Transform (FFT) module 302.

Those of ordinary skill in the art will recognize that channel 1 and channel 2 are two independent data streams, $h_1(t)$ and $h_2(t)$, recovered by receivers 22, 22'. These signals do not have to be differentiated in frequency, but may be. In one embodiment, they are at exactly the same frequency. On the other hand, the content of $h_1(t)$ and $h_2(t)$ may be different. With regard to antennas 12, 12' and receivers 22, 22', nothing about the present invention requires any redesign of conventional front end antenna/RF receiver blocks (12, 12', 22, 22').

As noted above, $h_1(n)$ and $h_2(n)$, the discrete-time samples of $h_1(t)$ and $h_2(t)$, are employed as the I and Q inputs of FFT 302, where I is the in-phase, or real component of a complex signal, and Q is the quadrature, or imaginary part of the complex signal. In other words, an FFT 302 might conventionally be employed with a baseband quadrature receiver that provides the I and Q signals from a single channel. The present invention differs from this approach by using the samples of two independent signals, i.e., using the first channel $h_1(t)$ as the real part of a complex input, and the samples of a second independent channel $h_2(t)$ as the imaginary part a complex input. As such, the total input to the FFT is:

$$h(t)=h_1(t)+j*h_2(t). \quad (1)$$

Those of ordinary skill in the art will understand that the spectrum of a complex signal is $I(f)+j*Q(f)$, where $I(f)$ is the spectrum of the in-phase input signal and $Q(f)$ represents the spectrum of the quadrature input signal. Accordingly, the output of FFT 302 is:

$$H(f)=H_1(f)+j*H_2(f). \quad (2)$$

At this point, the processing splits into parallel branches. Referring to the first channel, H(f) is directed into first channel processing module 304, which is configured to perform spectrum isolation calculations to recover the first channel spectrum $H_1(f)$. H(f) is also directed into second channel processing module 306. This module is also configured to perform spectrum isolation calculations to recover the second channel spectrum $H_2(f)$. Module 304 and module 306 take advantage of the fact that a real input has conjugate symmetry. In other words, $H_1(f)=H_1^*(-f)$. Similarly, a purely imaginary input yields a conjugate anti-symmetric output, $H_2(f)=-H_2^*(-f)$. These properties may be used to isolate $H_1(f)$ and $H_2(f)$ as follows:

$$H_1(f)=[H(f)+H^*(-f)]/2. \quad (3)$$

$$H_2(f)=[H(f)-H^*(-f)]/2j. \quad (4)$$

Module 304 isolates $H_1(f)$ by plugging equation (2) into equation 3. Similarly, module 306 isolates $H_2(f)$ by plugging equation (2) into equation (4).

$$H_1(f)=H_1(f)+jH_2(f)+H_1^*(-f)+jH_1^*(-f) \quad (5)$$

$$\text{but } H_1^*(-f)=H_1(f) \text{ and } H_2^*(-f)=-H_2(f) \quad (6)$$

$$H(f)+H^*(-f)=2H_1(f) \quad (7)$$

This reduces to, $$H_1(f) = \frac{[H(f) + H^*(-f)]}{2} \quad (8)$$

$H_2(f)$ may be obtained in similar fashion, $$H_2(f) = \frac{[H(f) - H^*(-f)]}{2j} \quad (9)$$

At this point, $H_1(f)$ is directed into channel processing module 308 and $H_2(f)$ is directed into second channel processing module 310. Module 308 and module 310 are spectrum extraction modules. Each spectrum extraction module is implemented using a frequency domain band pass filter (BPF) and a frequency translation filter.

Referring to FIGS. 4A-4C, several diagrams illustrating the functionality of spectrum extraction module 308 are provided. FIG. 4A shows the input spectrum, i.e., $H_1(f)$. The desired spectrum 404 is centered at the positive IF. Of course, $H_1(f)$ includes an image spectrum 402 centered at the negative IF. Referring to FIG. 4B, the BPF filter function 308' is implemented as a rectangular function of unit magnitude. The passband is a set of frequencies centered at the positive IF. The extent of the passband corresponds to the bandwidth of the desired spectrum 404, but in this embodiment, the passband is approximately one-quarter the sampling rate. Module 308 multiplies the signal spectrum 400 by the rectangular function 308' to get the desired spectrum. The stop band of the filter eliminates the image spectrum 402 and all other frequency components outside the passband. The filtered output is shown in FIG. 4C.

Referring to FIG. 5, the desired spectrum is frequency translated to zero frequency to obtain the baseband spectrum

[$H_{br1}(f)$]. Frequency shifting may be done in the frequency domain by circularly shifting the frequency samples. Frequency translation in this case may also be accomplished by decimating the signal in the time domain by a predetermined factor. In the examples shown in FIGS. 4-5, the factor equals 4. This decimation is more simply obtained in this embodiment by an inverse FFT of one quarter of the original spectrum of FIG. 4A, i.e. the samples lying between the dotted lines of FIG. 5. The functionality of channel processing module (spectrum extraction) 310' is identical to module 310 and therefore will not be independently described herein to avoid redundancy.

Referring back to FIG. 3, the spectrum depicted in FIG. 5 is directed into multiplier 312. The corresponding baseband spectrum for channel 2 is likewise directed into multiplier 312'. Referring to channel 1 processing, the filtered spectrum is multiplied by a reference spectrum (PC Ref 1), stored in memory element 314, to effect equalization and pulse compression. Reference memory element 314 and channel equalization module 312 form a channel equalization module. The values stored in memory 314 includes a pulse compression component and an equalization component.

Those of ordinary skill in the art will understand that memory 314 may include a plurality of correlation/equalization spectra. These spectra may be computed a priori and will represent correlation/equalization spectra that are a function of the frequency response of a particular channel.

Figure 2:
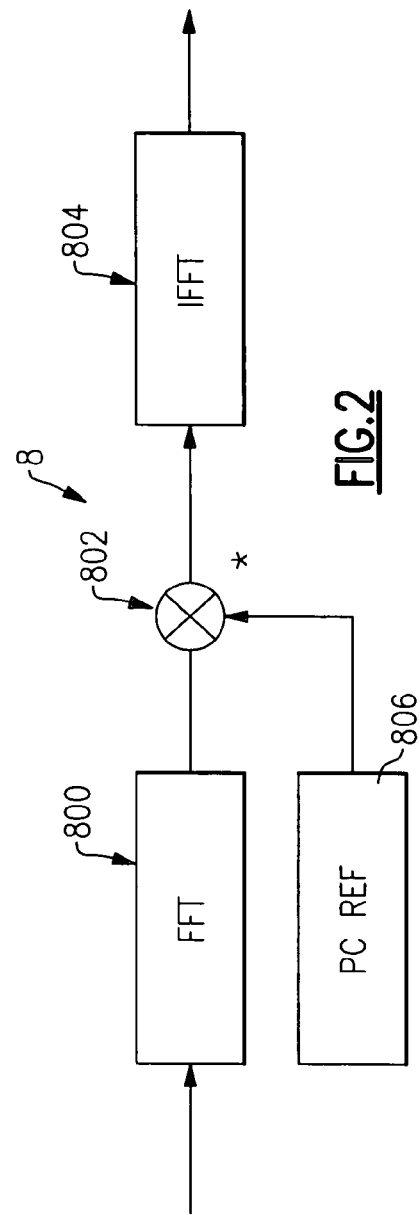
FIG. 2 is a block diagram of the pulse compressor depicted in FIG. 1 implemented in the frequency domain.

Pulse compression is performed by correlating the filtered input with a known reference value. Of course, the theory behind this concept is related to matched filter theory. Multiplier 312 combines a reference signal, which may be a representation of the transmitted signal (e.g., labeled PC for Pulse Compression), with the radar return, i.e., the filtered spectrum. As noted above, a correlation is performed in the time domain by calculating the convolution of the two signals, where one is time reversed and conjugated. However, correlation is more easily and conveniently performed in the frequency domain by multiplication, as illustrated in FIG. 2.

Matched filter theory teaches that the above described correlation will yield an output that has maximum signal-to-noise ratio if the noise is wide-sense stationary Gaussian. Intuitively, a convolution "slides" the complex conjugate of the PC reference, in time, against the channel signal (i.e., a return signal) and performs a sample-by-sample multiplication. Finally, the sum of all the products is calculated. By sliding the reference value relative to the return signal in time, the correlator output peaks when the reference signal and the return signal are aligned in time. At this point in time, the two signals "match." In other words, the match determines which of the multi-path signals corresponds to the actual return signal. The conjugation of the reference ensures that all the products add in phase. The above description is a qualitative description of the correlation process in the time domain. The present invention simplifies processing by performing the correlation in the frequency domain.

As noted above, adaptive equalization is combined with the pulse compression in the system depicted in FIG. 3. This is possible because adaptive equalization may be implemented as a filter. As noted in the background of the invention, for example, an adaptive equalizer may be implemented as a tapped-delay line (finite impulse response [FIR]) filter. The PC reference may be derived from a number of sources.

As those of ordinary skill in the art will appreciate, both correlation and adaptive equalization may be implemented using filters. In the frequency domain, any filter function can be obtained by multiplying the input by the frequency response of the filter. Thus, two filters in series can be combined into a single filter by taking the product of their frequency responses. Accordingly, PC Ref may be derived as follows:

$$H_{PC\ Output\ 1}(f) = H_1(f)[H_{TXwaveform}^*(f)H_{adap\ eq}(f)] \quad (10)$$

$$H_{PC\ Ref\ 1} = H_{TXwaveform}^*(f)H_{adap\ eq}(f) \quad (11)$$

$$H_{PC\ Output\ 1}(f) = H_1(f)[H_{PC\ Ref\ 1}] \quad (12)$$

Wherein $H_{PC\ Output\ 1}(f)$ is the spectrum of the baseband output signal "PC Output 1," $H^*_{TXwaveform}(f)$ is the conjugate of the spectrum of the first channel transmitter, and $H_{adapeq}(f)$ corresponds to an adaptive equalization filter value. Accordingly, the value stored in memory 314 may be the product of a correlation filter response and an adaptive equalization filter response, as applied to the spectrum of a transmitted signal. For example, if system 10 is implemented as a radar, and the radar is coherent, then the stored reference spectra may be based on the transmitted signal, which is known. The transmitted waveform may be sampled and digitized at baseband.

The adaptive equalization module is configured to match the frequency response of multiple channels in amplitude and phase. This is necessary to support other processes that require the channels to be matched, such as polarization transformations and spatial adaptivity (i.e., sidelobe cancellation, adaptive array processing, etc.). Without channel matching, it is difficult to achieve optimum adaptive performance over significant signal bandwidths.

The equalization employed by the present invention is adaptive in the sense that the filter function is derived periodically from actual collected data. A description of the training of the adaptive filter weights or coefficients is provided below. The training occurs periodically and depends on a number of factors. Those of ordinary skill in the art understand that training must be conducted whenever there is a change in the frequency response of any of the channels. Frequency response may be altered by the temperature of the electronic components, or by a change in the local environment, or by a change in the antenna orientation relative to the platform the antenna is mounted on. The list of examples is not meant to be exhaustive. Typically, a single calibration might be done once per mission for different conditions with the results being stored in memory for later use during the mission. These values may be stored in memory 314 (FIG. 3) in the form of a look-up table. The actual pulse compression reference, i.e. the representation of the transmitted waveform, may be stored only once, if the assumption is that any variations are second-order.

The training process applies a full-bandwidth signal to all channels simultaneously. In the radar processing example, the spectra are averaged over a number of pulse repetition intervals (PRIs). The ratio of the responses relative to a reference channel are calculated over the entire band at a frequency sampling rate consistent with the stored pulse compression references. The step of applying a full bandwidth signal to all channels simultaneously may be implemented, for example, by transmitting a signal into all of the antenna elements from a point equidistant (or as nearly as possible) from all antenna elements. Sometimes a signal is generated and split into each channel using matched cables. This is generally considered suboptimum, because the outputs do not include the frequency response of the antenna elements. The term "full-bandwidth" usually refers to a signal that occupies the same bandwidth as the signal to be used in the radar. The idea is that, to the extent possible, the exact same input is seen by each channel. The results are then compared to determine differences in the channel responses. Those of ordinary skill in the art will recognize that a similar procedure may be employed for a communication system or a sonar system.

The spectra that we are averaging are $H_1(f)$ and $H_2(f)$, and any others that might be used (i.e., when the number of channels is more than two). There is no fixed number of PRIs that should be used. The more PRIs used to calculate the average, the less thermal noise affects the estimate. The signal-to-noise ratio (SNR) for each frequency cell should be 20 dB or higher. A frequency cell is simply one output cell of the forward FFT shown in FIG. 3.

At this point in the training regimen, there are two or more averaged spectra, one from each channel in system 10. One of the averaged spectra is selected as the reference. Typically, the spectrum having the flattest amplitude response and the most linear phase is selected as the reference that the other channels would be matched to. In theory, any channel may be used as the reference. The complex ratio of each of the other channels to the reference is calculated for each frequency cell:

$$H_{adapt\,eq}(f) = \frac{H_1(f)}{H_2(f)} \qquad (13)$$

Since the spectrum is sampled, a value is calculated for each frequency cell over the full sampled spectrum. The reference is applied by simply multiplying $H_2(f)$ by $H_{adapteq}(f)$. This should give us a spectrum that is very close to being matched to $H_1(f)$ except for a constant amplitude and phase difference. However, as described above, this multiplication is combined with the correlator in the manner previously described. The procedure is followed for each channel using the same channel ($H_1(f)$ in this case) as reference.

Referring back to FIG. 3, the correlated and equalized spectrum is directed into multiplier 316 (316' for channel 2). This last multiplication module is an optional feature of the present invention. Time-delay steering of phased array inputs via digital beam forming uses the property:

$$F[h(t-\tau)] \rightarrow \exp(-j\omega\tau)F[h(t)] \qquad (14)$$

where "F" represents the Fourier Transform. This block is employed only if a channel is to be time delayed relative to other channels. Time delays may be employed to implement time-delay broadband steering of a phased array antenna. Phase-only narrowband steering can also be implemented by this multiplier. In this instance, the $\exp[-j\omega T]$ factor is replaced by the constant $\exp[-j\theta]$, wherein $\theta$ is the desired phase shift in radians.

For a finite number of fixed beams the time delay factors could be combined into the pulse compression reference. Further n×m pulse compression references could be stored in memory, i.e. in a look-up table. The integer n corresponds to the number of channels whereas the integer m corresponds to the number of beams. In other words, each channel may be configured to be time delayed in an integer number of ways. Accordingly, each beam will require its own set of $\exp(-j\omega T_{nm})$ factors, the factor $T_{nm}$ being used to determine the steering angle.

All of the time delay factors $T_{nm}$ can be pre-computed, as well as the $\exp(-j\omega T_{nm})$ factors. Either may be stored in a look-up table, depending upon the memory versus computing power constraints. This assumes that a number of fixed beams can be defined, as opposed to random steering with arbitrary pointing angles.

Finally, the output spectra are directed into inverse-FFT (IFFT) 320, 320'. IFFT 320 outputs PC Output 1, whereas IFFT 320' provides PC Output 2. The PC output signal is simply the magnitude of the radar returns as a function of range for one PRI of data. The next step in the processing would normally be coherent processing, such as moving target indicator (MTI) processing or Doppler processing, over a number of PRIs, or digital beam forming (coherent summation of signals across channels). On the other hand, single PRI detection may be done as well. Any of the usual forms of detection may be used. In one embodiment, a constant false alarm rate (CFAR) threshold detection process may also be employed.

In another embodiment of the present invention, PRI samples are overlapped, such that each processed PRI of data has some sample data from adjacent PRIs. The overlap should be enough to allow for any possible beam delay or advance. This embodiment compensates for a situation wherein the equalization and time delay of the signal is imperfect at the PRI end. This embodiment takes advantage of the adjacent samples disposed at the end of the previous PRI and at the beginning of the next PRI. If the data is being time delayed or advanced in time, some of the adjacent data may be needed for improved steering accuracy.

Figure 6:
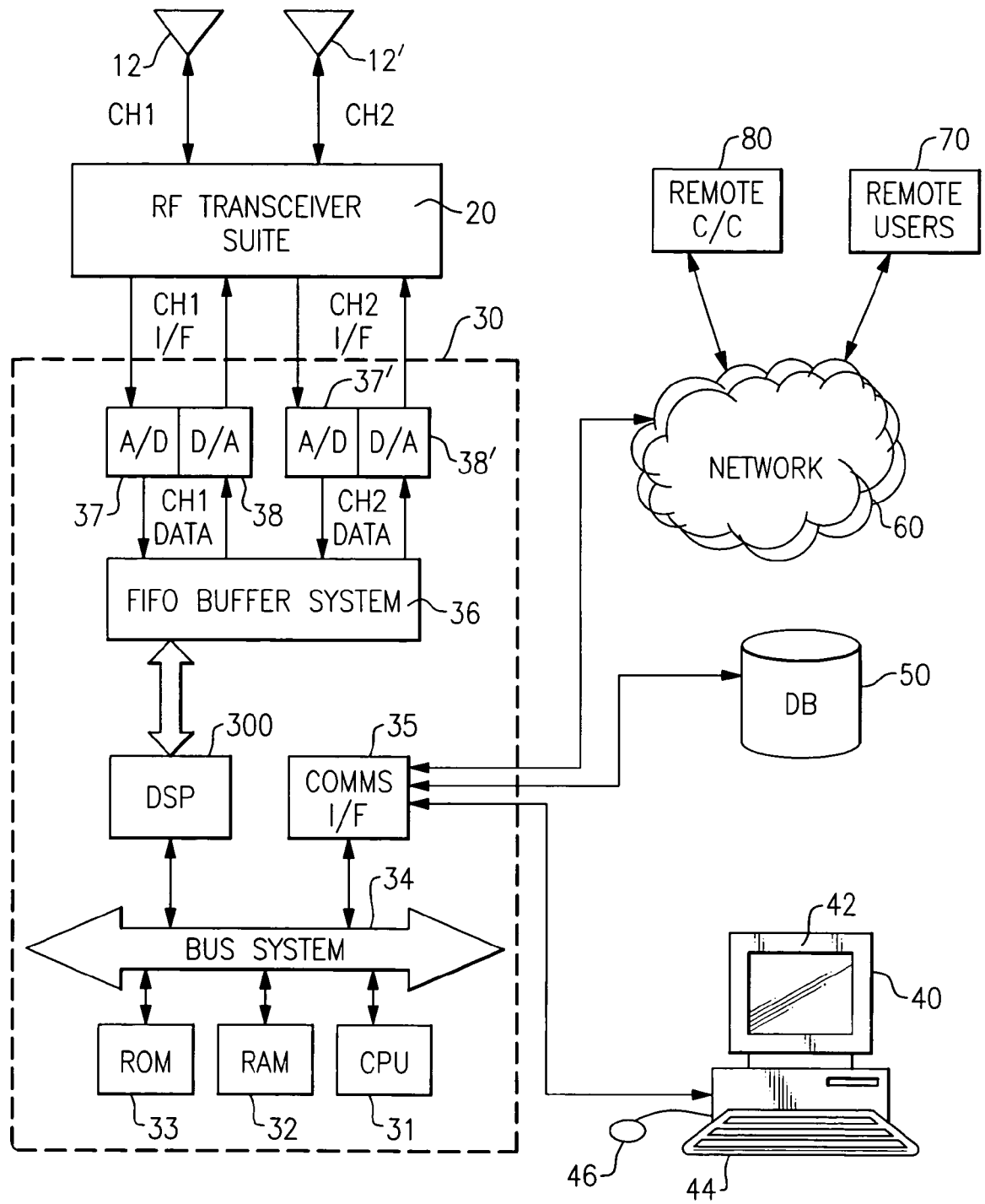
FIG. 6 is a hardware block diagram of a communication system in accordance with another embodiment of the present invention.
Figure 7:
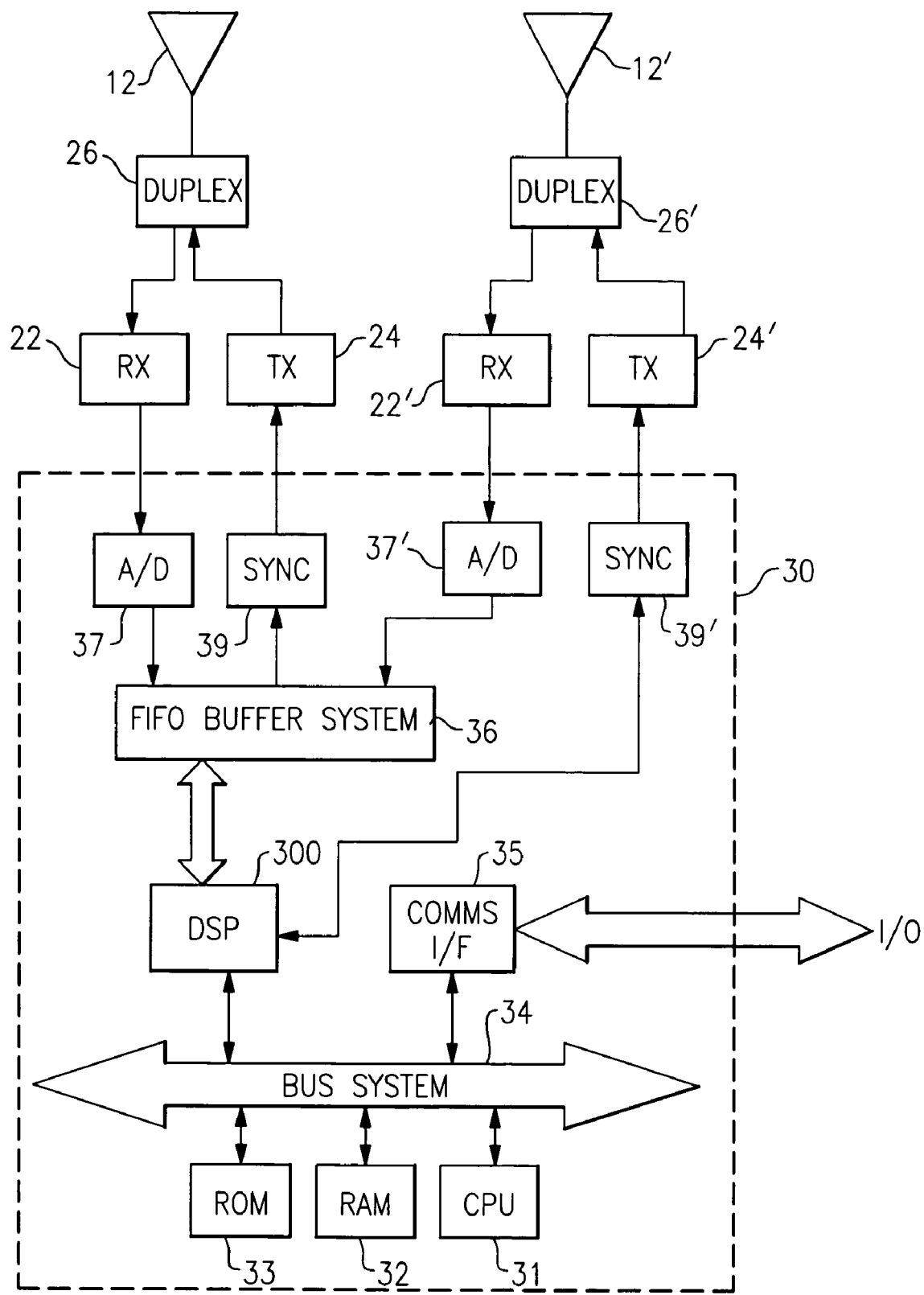
FIG. 7 is a hardware block diagram of a radar system in accordance with another embodiment of the present invention.

While the preceding discussion has been directed to a radar system, the present invention may be employed in any number of multi-channel processing systems. Several examples are provided to illustrate the versatility of the present invention. FIG. 6 depicts a generic communication system. FIGS. 6 and 7 show a radar system and a sonar system, respectively.

As embodied herein, and depicted in FIG. 6, a hardware block diagram of a generic communication system in accordance with an embodiment of the present invention is disclosed. FIG. 6 is intended to show how the present invention may be implemented from a hardware perspective. Channel 1 antenna 12 and channel 2 antenna 12' are coupled to an RF transceiver device 20. RF transceiver 20 is coupled to processing system 30. Processing system 30 may be configured to communicate with a user interface 40 and display 42, a database 50, and network 60. In particular, system 10 may communicate with remote users 70 and remote command/control unit 80 via network 60.

Processing system 30 may include a buss 34 for communicating data, address, and control signals. Read only memory (ROM) 33, central processing unit (CPU) 31, communications interface 35, RAM 32, and a digital signal processor (DSP) 300 are coupled to the bus 34. DSP 300 is coupled to A/D converters 37, 37' and D/A converters 38, 38' by way of FIFO buffers 36. Accordingly, full duplex communications may be implemented by system 10. The present invention may be employed in spread spectrum radio and in wireless telecommunication systems.

Of course, transceiver 20 includes a front end receiver 22. An RF signal received by antenna 12 is typically directed into a pre-amplifier disposed in receiver 22. Pre-amplifiers often include an amplifier and band select filter. The filter limits the input of the receiver to the frequencies/bands in which system 10 is intended to operate. Accordingly, the filter may prevent receiver saturation caused by unwanted signal sources. After pre-amplification, the signal is demodulated into some intermediate frequency (IF) compatible with the analog-to-digital (A/D) converters 37. Receiver 22 also may include a bandpass filter that is configured to further limit out of band signals.

As described in detail above, A/D converter 37 samples the signal $h_1(t)$ to provide a digital sample of an incoming message. Ultimately, the incoming message may be provided to a user via a communications console disposed in user interface 40. In another embodiment, the received message may be directed to a user coupled to network 60.

On the transmit side, DSP 300 provides FIFO buffer 36 with a packet of data for transmission. The data may be provided from a telecommunications device coupled to network 60, or from another source, such as user interface 40. If system 10 is a spread spectrum system, the transmitter may employ a modulation technique commonly referred to as frequency-hopping code division multiple access (FH-CDMA). Accordingly, the transmitter "hops" between available frequencies according to a specified algorithm which can be either random or preplanned. The transmitter operates in synchronization with a receiver, which remains tuned to the same center frequency as the transmitter. A short burst of data is transmitted over a narrow band of frequencies. Subsequently, the transmitter tunes to another frequency and transmits again.

It will be apparent to those of ordinary skill in the pertinent art that modifications and variations can be made to DSP 300 of the present invention depending on the processing power. For example, DSP 300 may be implemented using a field programmable gate array device (FPGA), an application specific integrated circuit (ASIC), or by any suitable off-the-shelf programmable DSP device provided by Motorola, Analog Devices, Texas Instruments, or other such DSP device manufacturers. Those of ordinary skill in the pertinent art will understand that the required processing power ultimately depends on how many channels are being processed and the number of samples per second being generated.

CPU 31 is selected to have sufficient computing power to support an operating system such as those provided by Microsoft, Sun Microsystems Inc., or any other suitable operating system. Accordingly, CPU 31 may be implemented by a processor manufactured by Intel, AMD, Texas Instruments, Motorola, or some other such device manufacturer.

RAM 32 may be configured to store data, digital samples from the communication channel, status information, and instructions for use by processor 31, DSP 300, and/or user interface 40. RAM 32 may also be used for storing temporary variables or other intermediate information during execution of instructions by the processor 31. Read only memory (ROM) 33 is provided to store static information and instructions for the processor 31. System 30 may include additional storage devices, such as a magnetic disk or optical disk. These devices may be coupled to the buss 34 for long term storage of data and instructions.

Processing system 30 may be coupled to user interface 40 by way of communications interface 35. The communication interface 35 provides a two-way data communications between user interface 40, database system 50, and/or network 60. Network 60 may be a local area network (LAN), a wide area network (WAN), and/or a telecommunications network. The telecommunications network may be a circuit switched network, a packet switched network, or a combination of the two.

It will be apparent to those of ordinary skill in the pertinent art that modifications and variations can be made to communications interface 35 of the present invention depending on the nature of the external connection. For example, communication interface 35 may be a digital subscriber line (DSL) card or modem, an integrated services digital network (ISDN) card, a cable modem, a telephone modem, or any other communication interface to provide a data communication connection to a corresponding type of communication line. As another example, communication interface 35 may be a local area network (LAN) card (e.g. for Ethernet™ or an Asynchronous Transfer Model (ATM) network) to provide a data communication connection to a compatible LAN. Wireless links may also be implemented by the present invention. In any such implementation, communication interface 35 sends and receives electrical, electromagnetic, or optical signals that carry digital data streams representing various types of information. Further, communication interface 35 may include peripheral interface devices, such as a Universal Serial Bus (USB) interface, a PCMCIA (Personal Computer Memory Card International Association) interface, etc. Although a single communication interface 35 is shown, multiple communication interfaces may be employed depending on the application.

The term "computer-readable medium" as used herein refers to any medium that participates in providing data and/or instructions to the processor 31 and/or DSP 300, for execution. Such a medium may take many forms, including but not limited to non-volatile media, volatile media, and transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, $E^2$PROM, a FLASH-EPROM, any other memory chip or cartridge, a carrier wave, or any other medium from which a computer can read.

Transmission media between processing system 30 and user interface 40, database 50, and network 60 may include coaxial cables, copper wire or fiber optics. Those of ordinary skill in the art will recognize that transmission media can also take the form of acoustic, optical, or electromagnetic waves, such as those generated during radio frequency (RF) and infrared (IR) data communications.

Referring to FIG. 7, a hardware block diagram of a radar system in accordance with another embodiment of the present invention is shown. With respect to channel 1, receiver 22 and transmitter 24 are coupled to antenna 12 by way of duplexer 26. Receiver 22 provides A/D converter 37 with signal $h_1(t)$ and receiver 22' provides A/D converter 37' with signal $h_2(t)$ in the manner described above. Processing system 30 employs a hardware configuration that is similar to that described above. After the data is processed, radar video from both channel 1 and channel 2 may be provided to an operator display, some other command and control device, by way of communications interface 35. On the transmit side, synchronizer 39 provides transmitter 24 with a transmit pulse in a conventional manner.

Figure 8:
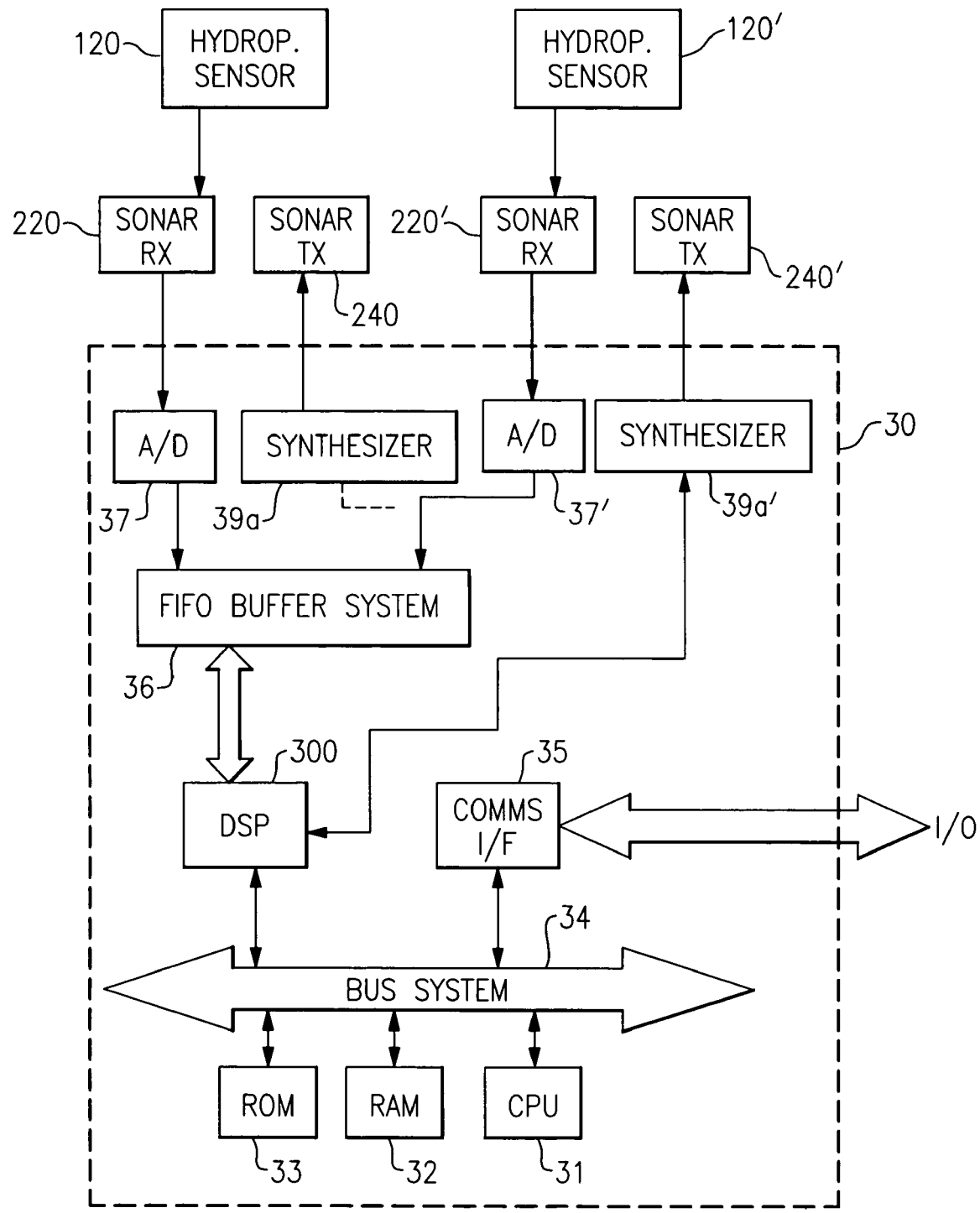
FIG. 8 is a hardware block diagram of a sonar system in accordance with yet another embodiment of the present invention.

Referring to FIG. 8, a hardware block diagram of a sonar system 10 in accordance with yet another embodiment of the present invention. System 10 typically includes an operator interface (not shown), processing system 30, sonar receive side equipment (220, 220', 120, 120'), and sonar transmission equipment (39a, 39a', 240, 240'). In this embodiment, processing system 30 is adapted to sonar processing.

The receive side processing is similar to that described above, with the exception that sonar receivers 220, 220' are configured to process acoustic signals rather than RF signals. Return signals are provided by hydrophonic sensor elements 120, 120'. Sensors 120, 120' provide their respective receivers 220, 220' with analog return signals. In the manner described above, the receivers provide A/D converter 37 and 37', with signals $h_1(t)$ and $h_2(t)$, respectively. The A/D converters provide DSP 300 with digital return samples.

On the transmit side, DSP 300 is configured to drive frequency synthesizer 39a, 39a'. The synthesizers are coupled to transmitters 52, 52'. As such, transmitters 52, 52' are configured to generate a "ping" having predetermined acoustic characteristics.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A multi-channel signal processing system comprising:
a fast Fourier transform (FFT) module configured to perform an FFT using a first channel time domain sample as an in-phase component of a complex signal input and using the second channel time domain sample as a quadrature component of the complex signal input, the FFT module providing a complex signal spectrum;
at least one intermediate frequency (IF) channel processing module coupled to the FFT module, the at least one IF channel processing module being configured to extract at least one channel sample spectrum as a function of the complex signal spectrum; and
at least one baseband channel processing module coupled to the at least one IF channel processing module, the at least one baseband channel processing module being configured to multiply the at least one channel sample spectrum by a channel reference spectrum to obtain a correlated and equalized at least one channel sample spectrum.

2. The system of claim 1, wherein the at least one IF channel processing module includes a first channel processing module configured to extract a first channel sample spectrum as a function of the complex signal spectrum.

3. The system of claim 2, wherein the first channel processing module includes a module configured to determine a real part of the complex signal spectrum, the real part of the complex signal spectrum corresponding to an intermediate frequency (IF) first channel sample spectrum.

4. The system of claim 3, wherein the first channel processing module includes a filter module configured to extract the first channel sample spectrum from the intermediate frequency (IF) first channel sample spectrum.

5. The system of claim 4, wherein the filter module includes a bandpass filter (BPF) implemented in the frequency domain, the BPF being centered at a positive IF and having a predetermined bandwidth to thereby eliminate image spectrum components, the output of the BPF being a filtered positive IF channel sample spectrum.

6. The system of claim 5, wherein the filter module includes a frequency shift module configured to translate the filtered positive IF channel sample spectrum to baseband to thereby generate the first channel sample spectrum.

7. The system of claim 1, wherein the at least one baseband channel processing module includes a first channel equalization module configured to multiply the first channel sample spectrum by a first channel reference spectrum to obtain a correlated and equalized first channel sample spectrum.

8. The system of claim 1, wherein the at least one IF channel processing module includes a second channel processing module configured to extract a second channel sample spectrum as a function of the complex signal spectrum.

9. The system of claim 8, wherein the second channel processing module includes a module configured to determine an imaginary part of the complex signal spectrum, the imaginary part of the complex signal spectrum corresponding to an intermediate frequency (IF) second channel sample spectrum.

10. The system of claim 9, wherein the second channel processing module includes a filter module configured to extract the second channel sample spectrum from the intermediate frequency (IF) second channel sample spectrum.

11. The system of claim 10, wherein the filter module includes a bandpass filter (BPF) implemented in the frequency domain, the BPF being centered at a positive IF and having a predetermined bandwidth to thereby eliminate image spectrum components, the output of the BPF being a filtered positive IF channel sample spectrum.

12. The system of claim 11, wherein the filter module includes a frequency shift module configured to translate the filtered positive IF channel sample spectrum to baseband to thereby generate the second channel sample spectrum.

13. The system of claim 1, wherein the at least one baseband channel processing module includes a second channel equalization module configured to multiply the second channel sample spectrum by a second channel reference spectrum to obtain a correlated and equalized second channel sample spectrum.

14. The system of claim 1, wherein the channel reference spectrum in the at least one baseband channel processing module includes a time delay factor.

15. The system of claim 14, wherein the channel reference spectrum is stored in a look-up table.

16. The system of claim 15, wherein the look-up table includes n×m channel references, wherein n is an integer value corresponding to the number of channels in the system, and m is an integer corresponding to the number of beams.

17. The system of claim 16, wherein the time delay factor is configured to steer a phased array antenna input.

18. The system of claim 1, further comprising at least one digital beam forming filter, the digital beam forming filter being configured to multiply the correlated and equalized at least one channel sample spectrum with a time delay factor.

19. The system of claim 18, wherein the at least one digital beam forming filter includes a first channel digital beam forming filter, a second channel digital beam forming filter, and/or both.

20. The system of claim 1, further comprising at least one inverse-FFT (IFFT) module coupled to the at least one baseband channel processing module, the at least one inverse-FFT module being configured to perform an inverse FFT on the correlated and equalized at least one channel sample spectrum to provide at least one channel time domain output sample.

21. The system of claim 20, wherein the at least one IFFT module includes a first channel IFFT module configured to perform an IFFT on a correlated and equalized first channel sample spectrum to provide a first channel time domain output sample.

22. The system of claim 21, wherein the at least one IFFT module includes a second channel IFFT module configured to perform an IFFT on a correlated and equalized second channel sample spectrum to provide a second channel time domain output sample.

23. The system of claim 22, wherein the first channel time domain output sample and/or the second channel time domain output sample correspond to a target range.

24. A radar system comprising the multi-channel signal processing system of claim 1.

25. A sonar system comprising the multi-channel signal processing system of claim 1.

26. A communication system comprising the multi-channel signal processing system of claim 1.

27. A method for processing multiple channels in a signal processing system, the method comprising:

providing a first channel time domain sample and a second channel time domain sample;

performing an FFT of a complex signal using the first channel time domain sample as an in-phase component of the complex signal and using the second channel time domain sample as a quadrature component of the complex signal, the FFT yielding a complex signal spectrum;

deriving at least one channel sample spectrum as a function of the complex signal spectrum;

extracting at least one baseband channel sample spectrum from the at least one channel sample spectrum; and multiplying the at least one baseband channel sample spectrum by a channel reference spectrum to obtain a correlated and equalized at least one channel sample spectrum, the correlated and equalized at least one channel sample spectrum being correlated and equalized by the step of multiplying.

28. The method of claim 27, further comprising the step of performing an IFFT on the correlated and equalized at least one channel sample spectrum to obtain at least one channel time domain output sample.

29. The method of claim 28, wherein the at least one channel time domain output sample includes a first channel time domain output sample.

30. The method of claim 29, wherein the at least one channel time domain output sample includes a second channel time domain output sample.

31. The method of claim 27, wherein the step of deriving includes the step of determining a real part of the complex signal spectrum, the real part of the complex signal spectrum corresponding to an intermediate frequency (IF) first channel sample spectrum.

32. The method of claim 31, wherein the step of extracting includes the step of filtering the intermediate frequency (IF) first channel sample spectrum to obtain a filtered positive IF first channel sample spectrum, the filtered positive IF first channel sample spectrum having no image spectral components therein.

33. The method of claim 32, further comprising the step of translating the filtered positive IF first channel sample spectrum to baseband to obtain a baseband first channel sample spectrum.

34. The method of claim 27, wherein the step of multiplying includes multiplying a baseband first channel sample spectrum by a first channel reference spectrum to obtain a correlated and equalized first channel sample spectrum.

35. The method of claim 34, wherein the step of multiplying performs channel equalization and pulse compression.

36. The method of claim 27, wherein the step of deriving includes the step of determining an imaginary part of the complex signal spectrum, the imaginary part of the complex signal spectrum corresponding to an intermediate frequency (IF) second channel sample spectrum.

37. The method of claim 36, wherein the step of extracting includes the step of filtering the intermediate frequency (IF) second channel sample spectrum to obtain a filtered positive IF second channel sample spectrum, the filtered positive IF second channel sample spectrum having no image spectral components therein.

38. The method of claim 37, further comprising the step of translating the filtered positive IF second channel sample spectrum to baseband to obtain a baseband second channel sample spectrum.

39. The method of claim 27, wherein the step of multiplying includes multiplying a baseband second channel sample spectrum by a second channel reference spectrum to obtain a correlated and equalized second channel sample spectrum.

40. The method of claim 39, wherein the step of multiplying performs the steps of channel equalization and pulse compression.

41. The method of claim 27, wherein the method for processing multiple channels is performed in a radar signal processing system.

42. The method of claim 27, wherein the method for processing multiple channels is performed in a sonar signal processing system.

43. The method of claim 27, wherein the method for processing multiple channels is performed in a communications signal processing system.

44. The method of claim 43, wherein the communications signal processing system is a spread spectrum system.

45. The method of claim 43, wherein the communications signal processing system is a telecommunications system.

46. A system comprising:

a first receiver system configured to provide a first channel time domain sample, the first channel time domain sample corresponding to a first signal propagating in an environment;

a second receiver system configured to provide a second channel time domain sample, the second channel time domain sample corresponding to a second signal propagating in an environment; and a digital signal processor (DSP) coupled to the first receiver system and the second receiver system, the DSP being programmed to, perform an FFT of a complex signal using the first channel time domain sample as an in-phase component of the complex signal and using the second channel time domain sample as a quadrature component of the complex signal, the FFT yielding a complex signal spectrum, deriving a first channel sample spectrum and a second channel sample spectrum as a function of the complex signal spectrum, extract a first baseband channel sample spectrum from the first channel sample spectrum and a second baseband channel sample spectrum from the second channel sample spectrum, multiply the first baseband channel sample spectrum by a first channel reference spectrum to obtain a correlated and equalized first channel sample spectrum, and multiply the second baseband channel sample spectrum by a second channel reference spectrum to obtain a correlated and equalized second channel sample spectrum, and perform an IFFT on the correlated and equalized first channel sample spectrum and the correlated and equalized second channel sample spectrum to obtain first channel time domain output sample and a second channel time domain output sample.

47. The system of claim 46, further comprising a first antenna and a second antenna coupled to the first receiver system and the second receiver system respectively, the first antenna providing the first receiver with a first RF signal and the second antenna providing the second receiver with a second RF signal.

48. The system of claim 47, wherein the first antenna and the second antenna are phased array antennas.

49. The system of claim 47, wherein the first RF signal and the second RF signal include reflected radar pulses.

50. The system of claim 47, wherein the first RF signal and the second RF signal include RF communication signals.

51. The system of claim 46, further comprising a first hydrophonic sensor and a second hydrophonic sensor coupled to the first receiver system and the second receiver system respectively, the first hydrophonic sensor providing the first receiver with a first acoustic signal and the second hydrophonic sensor providing the second receiver with a second acoustic signal.

52. The system of claim 47, wherein the first receiver system includes a first A/D converter configured to convert a first channel IF signal into the first channel time domain sample, and wherein the second receiver system includes a second A/D converter configured to convert a second channel IF signal into the second channel time domain sample.

53. The system of claim 46, further comprising a user interface coupled to the DSP.

54. The system of claim 53, wherein the user interface further comprises:

at least one output device configured to output the first channel time domain output sample and the second channel time domain output sample; and at least one input device configured to provide the system with commands and/or data.

55. The system of claim 54, wherein the at least one output device includes a display configured to provide the first channel time domain output sample and the second channel time domain output sample in a visual format.

56. The system of claim 55, wherein the visual format displays visual indicia that includes text and/or video.

57. The system of claim 55, wherein the at least one output device includes an annunciator configured to provide the first channel time domain output sample and the second channel time domain output sample in an audible format.

* * * * *